United States Patent [19]

Lerouge et al.

[11] Patent Number: 4,668,872
[45] Date of Patent: May 26, 1987

[54] ELECTRONIC CONTROL SYSTEM FOR A DIESEL ENGINE, GENERATOR AND ELECTRIC MOTOR POWER TRAIN

[75] Inventors: Bernard Lerouge, Chatou; Luc Jourdan, Grenoble, both of France

[73] Assignee: Alsthom and Neyrpic, France

[21] Appl. No.: 807,620

[22] Filed: Dec. 11, 1985

[30] Foreign Application Priority Data

Dec. 11, 1984 [FR] France .................... 84 18906

[51] Int. Cl.[4] .................................. H02P 5/00
[52] U.S. Cl. .................... 290/40 R; 290/3; 290/17; 290/14; 290/40 C; 123/350; 322/32; 322/29
[58] Field of Search ........ 290/14 R, 17, 40 R, 290/21, 40 A, 40 B, 40 C; 123/340, 350, 200, 205, 339, 351, 378, 445, 446, 458; 318/146, 147, 157; 364/494, 492, 431.10, 431.03, 431.05, 431.07, 431.01, 431.02; 322/29, 31, 32

[56] References Cited

U.S. PATENT DOCUMENTS

| 3,263,142 | 7/1966 | Adoutte et al. | 290/14 X |
| 3,325,650 | 6/1967 | Barnes | 290/40 R |
| 3,551,685 | 12/1970 | Corry | 290/40 R X |
| 3,621,370 | 11/1971 | Vandervort | 290/40 A X |
| 3,878,400 | 4/1975 | McSparran | 290/14 |
| 4,015,187 | 3/1977 | Sasaki et al. | 290/40 C X |
| 4,119,861 | 10/1978 | Gocho | 322/32 X |
| 4,219,738 | 8/1980 | Griesinger | 290/40 R |
| 4,223,654 | 9/1980 | Wessel et al. | 123/340 X |
| 4,292,531 | 9/1981 | Williamson | 290/14 |
| 4,307,690 | 12/1981 | Rau et al. | 290/40 R X |
| 4,322,630 | 3/1982 | Mezera et al. | 290/40 C |
| 4,330,743 | 5/1982 | Glennon | 322/29 X |
| 4,417,194 | 11/1983 | Curtiss et al. | 290/40 B X |
| 4,426,980 | 1/1984 | Eisele et al. | 123/350 X |
| 4,482,813 | 11/1984 | Grand-Perret et al. | 290/40 R |
| 4,527,071 | 7/1985 | Ausiello | 290/40 R X |

Primary Examiner—William M. Shoop, Jr.
Assistant Examiner—Shik Luen Paul Ip
Attorney, Agent, or Firm—Sughrue, Mion, Zinn, Macpeak, and Seas

[57] ABSTRACT

The inventive control system introduces the current ($\Delta I$) and voltage ($\Delta C$) deviations simultaneously with the injection set point (C) to define a new injection set point (C') that is utilized in conjunction with the measurement of diesel engine speed ($V_{rD}$) to adjust the injection and with the measurement of the injection flow rate $C_r$ to adjust the generator excitation current.

1 Claim, 5 Drawing Figures

ELECTRONIC CONTROL SYSTEM FOR A DIESEL ENGINE, GENERATOR AND ELECTRIC MOTOR POWER TRAIN

This invention relates to an electronic control system for a power train comprising a diesel engine, an electrical generator driven by the diesel engine and an electric motor supplied by the generator. Such a power train may be installed for example in a locomotive.

Among the known control systems for such a power plant, is a system described in U.S. Pat. No. 4,482,813 filed Mar. 25, 1983, which provides a train engine control by which the engineer first chooses the electrical power required for the traction he desires.

To this end the engineer has available a master control switch enabling the simultaneous generation of set points for generator voltage, electric motor current and Diesel engine fuel injection.

The system comprises a first multiple comparator which receives the instantaneous values of the above-mentioned variables and generates, based upon the deviations from the set points, a generator excitation current value to change the generator's power output.

However, this action alters the fuel injection to the diesel engine. In order to maintain the engine operating point on the injection/speed curve corresponding to the lowest fuel consumption, it is necessary to have a second circuit to develop, based upon the actual, measured injection, a speed signal which, when compared with the true, measured speed of the diesel engine, can supply a corrected injection value.

If it is to be stable a control system like the one just described very briefly, but which is described in detail in the above-mentioned patent application, must be slow. This accordingly entails that the diesel engine will not be operating at its regime of lowest fuel consumption during a significant part of its operating time.

It is an object of the present invention to provide a control system guaranteeing full time operation of the diesel-electric power train at the point of least fuel consumption for the given power requirement.

The invention accordingly provides an electronic control system for a power train comprising a diesel engine driving a generator, which generator in turn supplies electric current to an electric motor, said control system being applicable in particular to locomotive control and comprising a master controller manipulated by a locomotive engineman and displaying a multiple set point pertaining to the generator current and voltage and to diesel fuel injection, and means for comparing said current and voltage set points with the measured values of the corresponding variables and supplying output signals representing the deviations, said control system wherein:

said deviation or error signals and said injection set point are applied to the input of a computer which generates a new set point for diesel engine injection, said new set point being delivered,
on the one hand to a circuit having in store the data of the optimal injection/speed curve for the diesel engine and feeding to the input of a first electronic controller a diesel engine speed set point value, said first controller also receiving a signal representative of the speed measurement of the diesel engine and supplying a correcting signal to change the injection of the diesel engine,
and on the other hand to one of the inputs of a second electronic controller whose other input receives a signal representative of the measured value of the injection flow rate and which outputs a correcting signal to change the value of the generator excitation current.

The novel features and advantages of the invention will be more readily understood in reading the following description of a preferred embodiment thereof, taken in conjunction with the appended drawings in which.

Figure 1:
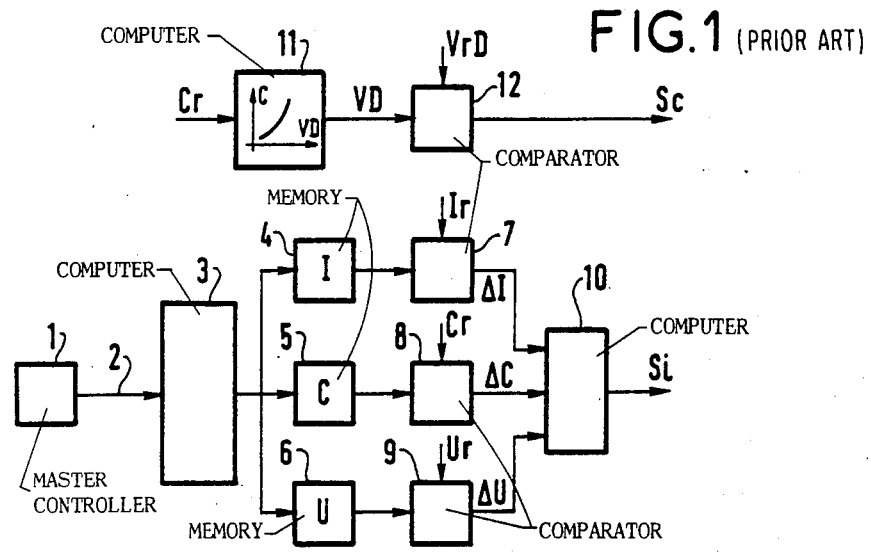
FIG. 1 is a block diagram of an electronic control system according to the prior art for a diesel-electric power plant.

Referring first to FIG. 1, which is a simplified diagram of the afore-mentioned prior art control system, said system can be seen to consist of a master controller 1 which sends orders 2 for progressing, regressing or stopping to a unit 3 which sets a value for the multiple set point that serves to establish a plurality of individual set points derived from memories 4, 5 and 6.

Memory 4 contains the current output set point I for the main generator. Memory 5 contains the fuel injection set point C for the diesel engine and memory 6, the voltage set point U for the alternator.

These set points are addressed respectively to comparators 7, 8 and 9 which receive true measured values $I_r$, $C_r$ and $U_r$ (r for "real") of the afore-mentioned variables and output the deviations $\Delta I$, $\Delta C$ and $\Delta U$ ($\Delta I = I_r - I$, $\Delta C = G - C$, $\Delta U = U_r - U$).

These deviations are addressed to a computer 10 which outputs a signal Si used to command a decrease or an increase of the generator excitation current i: namely an increase if the deviation values are all negative and a decrease if at least one deviation value is positive or equal to zero.

The prior art system further includes a chain comprising a unit 11 receiving the diesel engine measured injection signal $C_r$ and developing a speed set point signal $V_D$ corresponding to the lowest fuel consumption of the diesel engine. This signal is sent to a comparator 12 which also receives a signal $V_{rD}$ corresponding to the measured speed of the diesel engine and supplies an output signal SC which is used to command an increase or a decrease of the rate of fuel injection to the diesel engine.

Figure 2:
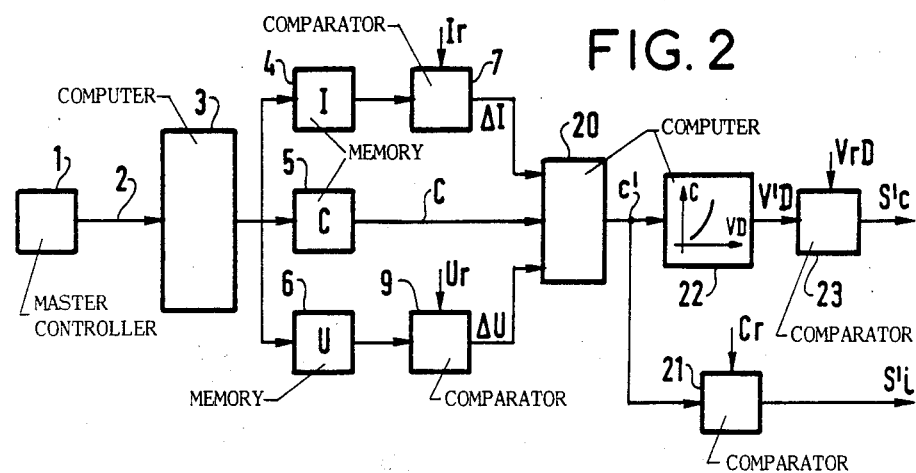
FIG. 2 is a block diagram of an electronic control system according to the invention for a diesel-electric power plant.

In FIG. 2, which is a basic block diagram of the control system according to the invention, like components carried over from the system of FIG. 1 are given like references.

The signals $\Delta I$, C and $\Delta U$ are sent to a computer 20 which in this case generates a new injection rate set point value C'.

The latter set point C' is compared in an electronic controller 21 to the actual measured value $C_r$ of the injection rate and the signal $S'_i$ output by the comparator is utilized to change the generator's excitation current.

This same modified set point C' is applied to a computer circuit 22 which computes the speed $V'_D$ corresponding to the diesel engine's most economical operation.

The value $V'_D$ is compared by the electronic comparator 23 to the actual speed of the diesel engine and the output signal $S'_c$ is used to control the output of the diesel injection pumps.

The system which has just been schematically described and which will be described in greater detail hereinafter provides parallel control and monitoring of the diesel engine (thanks to the injection flow rate error correction signal) and the alternator (thanks to the generator excitation current error correction signal).

Figure 3A:
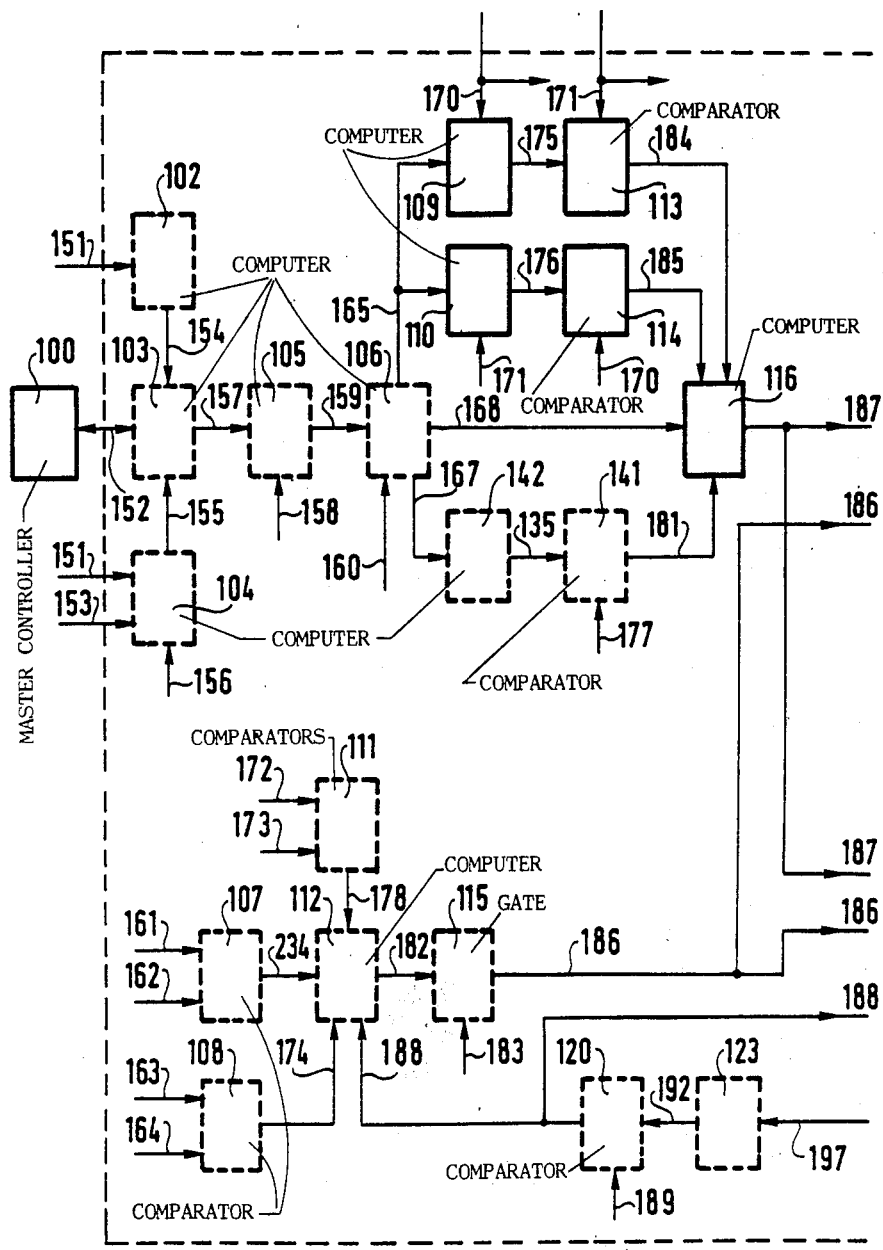
FIGS. 3A and 3B are the two halves of a detailed block diagram of a control system according to the invention applied to the operation of a locomotive.
Figure 3B:
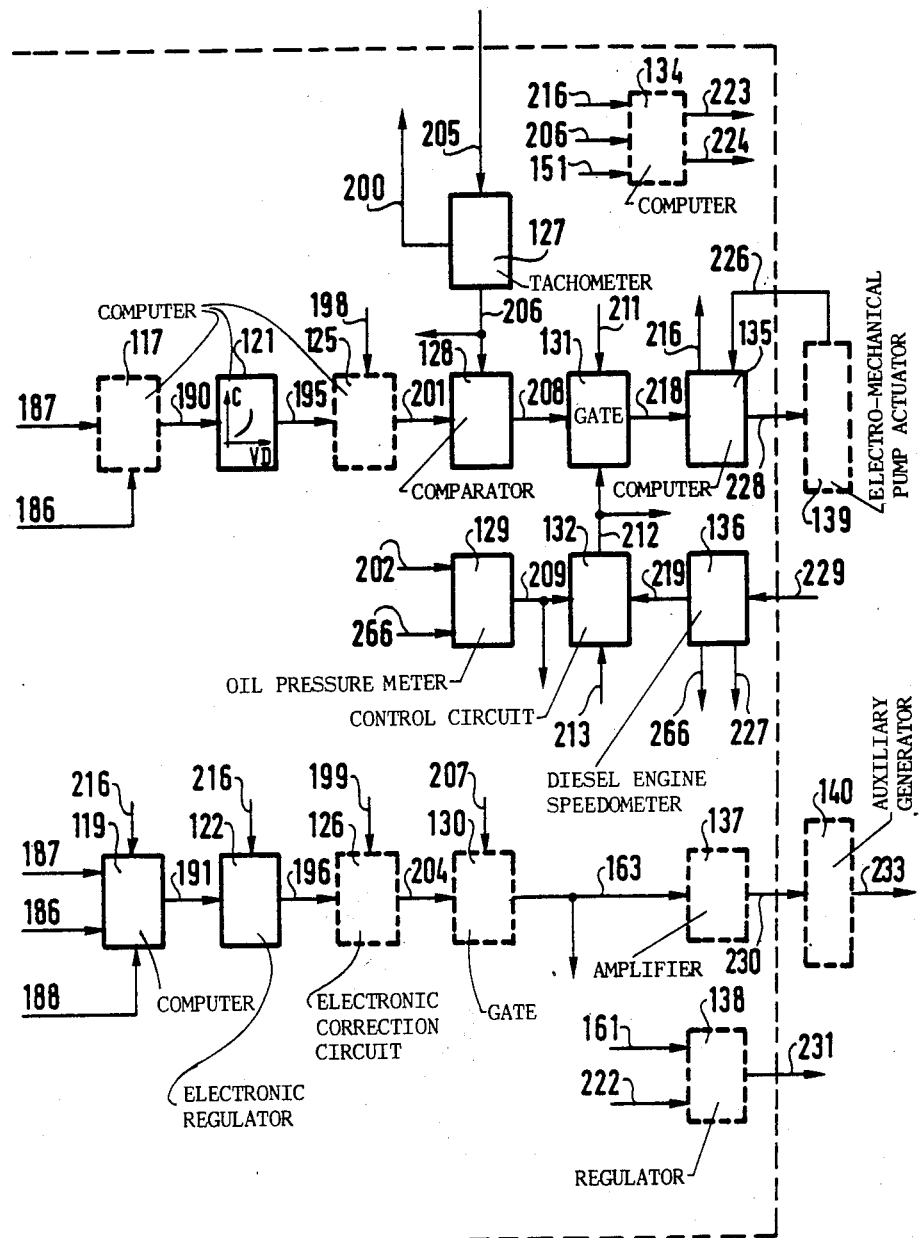

FIGS. 3A and 3B are a detailed block diagram of the control system, including the control and monitoring units already mentioned and newly introduced parameters.

The system can be used to control a diesel-electric power plant for a locomotive comprising a diesel engine together with its fuel injection pumps, a main generator and an auxiliary generator, both driven by the diesel engine. The main generator supplies current to an electric traction motor of the locomotive. The auxiliary generator supplies the excitation current for the main generator. Various other components typically equipping a diesel-electric locomotive will also appear in the description which follows.

Reference 100 designates the master controller normally manipulated by the engineer or driver to transmit advancing, reversing or stopping commands 152 to a computer 103 that generates a basic set point 157, taking into account, as the need arises in operation, the following signals:

a set point signal 154 developed by a computer circuit 102 on the basis of the signal 151 representing the locomotive's measured speed, and a set point signal 155 developed by a computer circuit 104 that compares the measured speed 151 with the speed set point 153. The latter circuit 104 also receives a signal 156 representative of other parameters such as the limiting of the locomotive's speed.

The base set point can be changed by a computer circuit 105 receiving a signal 158 indicative of the locomotive's operating mode, ie. traction, braking or air conditioning mode, to yield a modified base set point 159.

A computer circuit 106, receiving on the one hand said modified basic set point 159 and on the other hand, as the case may be, a zero reset or power cutback signal 160 (in the event of slipping, shunting or isolating of a traction motor for example), generates three set points 165, 167 and 168.

Set point 165 is sent to a computer 109 that receives a signal 170 representative of the actual measured voltage of the main generator to compute a current set point 175.

Figure 4:
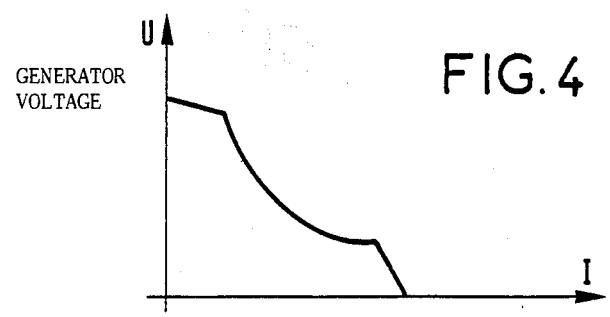
FIG. 4 is a graph of the current/voltage set point for the electrical generator.

It is desired that the generator's voltage U/current I characteristic for a given basic set point be as plotted in the graph of FIG. 4, namely:
linear at low currents,
linear at high currents,
and hyperbolic between the two latter zones.

Set point 175 is compared in a comparator 113 with a signal 171 representative of the measured value of the current of the main generator. The comparator 113 supplies a signal 184 representative of the difference between the actual measured generator current and the current set point.

Set point 165 is also sent to a computer 110 which receives the signal 171 representative of the actual, measured generator current value, and supplies a voltage set point 176 complying with the graph of FIG. 4. This signal 176 is applied to a comparator 114 that receives the signal 170 representative of the actual, measured main generator voltage and supplies a signal 185 representative of the difference between the measured generator voltage and the voltage set point.

Set point 168 is the diesel engine injection rate set point.

Set point 167 is applied to a computer 142 to develop a braking current set point 135 which is applied to a comparator 141 that also receives the measured value of the braking current 177 and generates a signal 181 representative of the difference between the measured braking current and the braking current set point.

The error signals 184, 185 and 181 and set point 168 are all applied to a computer 116 that generates a signal 187 which is a corrected injection rate set point.

It will now be explained how this latter set point 187 is utilized to control the electrical power, as well as the diesel engine speed and injection rate, of the traction system.

Set point 187 is modified by a computer circuit 117 to account for an error correcting setpoint 186 to be explained hereinafter.

Circuit 117 develops a final injection set point 190.

The correction set point 186 takes into account different parameters of the diesel-generator set, depending upon actual operation, as follows: engine coolant temperature, the value of the auxiliary generator's excitation current, the value of the main generator's excitation current, and the value of the supercharging pressure.

A comparator 107 receives a signal 161 representative of the diesel engine's cooling water temperature and compares it with a set point value 162, then supplies a signal 234.

A comparator 108 receives a signal 163 representative of the measured value of the auxiliary generator's excitation current and compares it with a set point value 164, to supply a signal 174.

A comparator 111 receives a signal 172 representative of the value of supercharging pressure and compares this signal with a set point 173 to supply a signal 178.

A comparator 120 receives a signal 189 representative of the measured value of the main generator's excitation current and compares it with a set point 192 generated by a set point generator 123 on the basis of control commands 197, then supplies an output signal 188.

The signals 174, 178, 188 and 234 output respectively by the comparators 108, 111, 120 and 107 are sent to the inputs of a computer 112 which outputs a temporary correction signal 182. The latter signal is forwarded via a gate 115 as transmitted correction signal 186 and, as previously indicated, is applied to the input of computer circuit 117.

The latter circuit generates the final injection set point 190 based upon signals 187 and 186.

Set point 190 is sent to the input of a computer circuit 121 which, having in store the date on the diesel injection rate/speed curve $C(V_D)$ corresponding to the least fuel consumption, generates a diesel engine speed set point 195. This speed set point is adjusted by a computer circuit 125 according to commands 198 which may be slowing down, acceleration or safety commands. The diesel engine speed set point as adjusted, which bears the reference 201 in the figure, is sent to the input of an electronic controller 128 which receives a signal 206 representative of the measurement of the diesel engine's speed. The comparator 128 supplies a control signal 208. The signal 206 is developed by a tachometer 127 or rev counter on the basis of the signals 205 coming from speed sensors or frequency sensors. Tachometer 127 also monitors and remotely indicates the measurement of the diesel engine speed. If a fault occurs, it generates and alarm signal 200. An enabling gate 131 receives the control signal 208 and either forwards it as signal 218 or holds it, depending on whether it receives any stopping signals 212 or speed limiting signals 211. The stopping signals 212 are generated by a control circuit 132 to be described subsequently herein. Signal 218 is routed to the input of a computer circuit 135 which receives a signal 226 representative of the position of the injection pumps and supplies a control signal 288 to the electromechanical actuator 139 of the injection pumps.

The electric power control circuit operates as follows.

A computer circuit 119 receives the following input signals: the corrected injection rate set point 187, the correction set point 187, the difference or comparison signal 188 between the set point value and the measured value of the main generator excitation current and signal 216, representative of the measured value of the injection into the diesel engine.

This circuit outputs an error signal 191 to drive an electronic controller or regulator 122.

The latter controller or regulator 122 provides an output signal 196 that is modified in 204 in passing through a correcting circuit 126 receiving a correction signal 199 that takes into account the structure of the diesel-generator set.

A gate circuit 130 receiving the signal 204 either forwards this signal or sets it to zero according to the commands 207 from other locomotive protection systems.

The gate 130 delivers a signal 163 which is amplified to yield signal 230, by an amplifier 137, to form the excitation current for the auxiliary generator 140. The latter supplies the excitation current for the main generator 233.

The control system according to the invention further comprises stopping and safety devices which are independent of the other system circuitry. Measurement 266 of actual diesel engine speed is made by a diesel engine speed meter 136 on the basis of inputs 229 from a speed sensor which has been omitted from the block diagram, but which is part of the protective system. Various flip-flops supply data 227 about the exceeding of speed thresholds to the other locomotive systems. If the overspeed threshold is exceeded, the relevant flip-flop sends a stopping command 219 to the above-mentioned control circuit 132 as well as to other locomotive systems.

Said control circuit 132 also receives commands 209 from an oil pressure 202 meter 129 according to the actual speed 266 of the diesel engine and stopping orders 213 coming from other locomotive systems.

The commands 209 from the oil pressure meter 129 are also routed to other locomotive systems for informational purposes. The control circuit 132 sends stopping commands 212 to gating means 131 and to other units of the locomotive.

Based upon the actual measurements of locomotive speed 151, on the speed of the diesel engine 206 and on diesel injection 216, a computer circuit 134 computes the instantaneous 223 and the cumulative 224 fuel consumption values.

The signals 223 and 224 enable remote display of these two fuel consumption values in the locomotive cab.

A regulator 138 controls the power supply to the cooling fan's electromechanical coupler. The control signal 231 is calculated so as to maintain equality between the cooling water temperature measurement 161 and the temperature set point 222.

The control system one embodiment of which has been described in the foregoing for exemplary purposes not intended to limit the scope of the invention ensures that the locomotive will operate at all times at its point of least fuel consumption for the given desired power.

The system is all-electronic and meets maintenance-free railroad technology requirements.

Its advanced design allows it to be easily integrated into the various processes of diesel locomotives. Easily parameterized and adaptable, its many options lend it a universal quality. It can be used with all types of electrical transmissions, including both direct current and three-phase alternating current traction motors.

What is claimed is:

1. In an electronic control system for a power train comprising a diesel engine driving a generator which supplies electric current to an electric motor, said control system comprising a master controller setting a multiple set point relating to the current and voltage of said generator and to the injection of fuel into the diesel engine and means for comparing said current and voltage set points with actual measured values of the corresponding quantities and supplying output signals representative of the deviations found, the improvement within said control system further comprising:

means for applying said deviations and said injection set point to the input of a computer which generates a new set point for diesel engine injection, means for delivering said new set point, to a computer circuit having in store the data of the optimal injection/speed curve for the diesel engine and feeding to the input of a first electronic controller a diesel engine speed set point value, said first controller also receiving a signal representative of the speed measurement of the diesel engine and said system including means for supplying a correcting signal to change the injection of the diesel engine, and further means for delivering said new set point to one input of a second electronic controller, said second electronic controller further including an input for receiving a signal representative of the measured value of the injection flow rate and said second electronic controller outputting a correcting signal to change the value of the generator excitation current.

* * * * *